United States Patent [19]

Knowles

[11] Patent Number: 4,911,642

[45] Date of Patent: Mar. 27, 1990

[54] COLOR WHEEL PALETTE

[76] Inventor: Glen Knowles, 43651 Bravo La., Lancaster, Calif. 93535

[21] Appl. No.: 380,423

[22] Filed: Jul. 17, 1989

[51] Int. Cl.⁴ .................... G09B 19/00; G09B 11/00; B05C 17/00; B44D 3/00
[52] U.S. Cl. ....................................... 434/84; 434/98; 206/1.8
[58] Field of Search ............... 434/81, 84, 98; 206/81, 206/386, 499, 501, 1.7, 1.8; 220/23, 355, 356

[56] References Cited

U.S. PATENT DOCUMENTS

| | | |
|---|---|---|
| 748,026 | 12/1903 | Sussmilch . |
| 2,107,239 | 2/1938 | Eckhoff ................................. 206/1.8 |
| 2,124,810 | 7/1938 | Allman . |
| 2,171,675 | 9/1939 | Travnitschek .................... 206/1.8 X |
| 2,565,912 | 8/1951 | Davis . |
| 3,777,414 | 12/1973 | Robinson . |
| 3,815,265 | 6/1974 | DePauw . |
| 4,027,404 | 6/1977 | Brant . |
| 4,046,250 | 9/1977 | Amezcua . |

Primary Examiner—Richard J. Apley
Assistant Examiner—J. L. Doyle
Attorney, Agent, or Firm—John J. Posta, Jr.

[57] ABSTRACT

The color wheel palette includes a generally circular bottom plate with a raised annular shelf and a non-raised central portion, the shelf having a number of spaced color paint wells uniformly disposed therein which may contain color paints therein, while the central portion is divided by raised partitions into a number of color-mixing wells. The shelf wells are sloped downwardly and outwardly from their inner margins to help pool the paints therein. A generally circular cover plate of a slightly larger size and the same general configuration as the bottom plate is releasably stacked over the bottom plate to protect the paint. The cover plate has preferably three groups of three shallower color paint or color-mixing shelf wells which register with the shelf wells of the bottom plate. Each group is preferably about 120° apart and aligned with a different one of the three central portion color-mixing wells of the cover plate, which register with those of the bottom plate. The palette may also include a generally circular top plate stacked on and of about the same size as the cover plate. The cover plate contains grooves in its top surface which form partitions to divide the cover plate into separate color mixing areas when it is inverted. All three plates have peripheral sidewalls which flare outwardly. That portion of the top plate has less flare so that the top plate stacks on the cover plate with its top surface well above that of the cover plate.

9 Claims, 2 Drawing Sheets

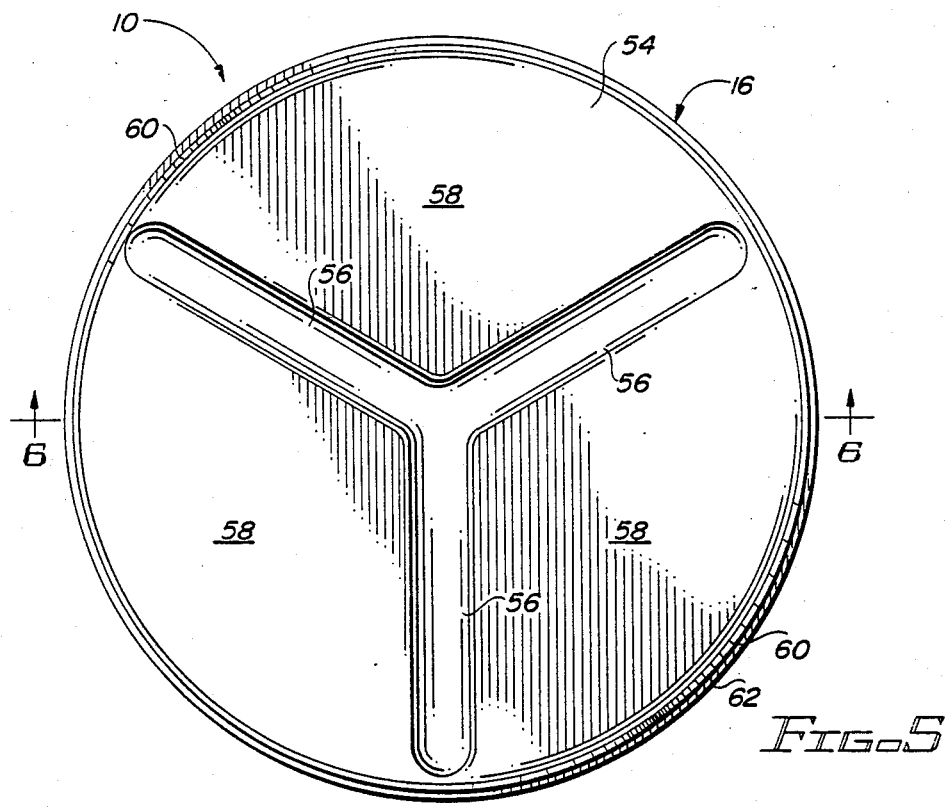
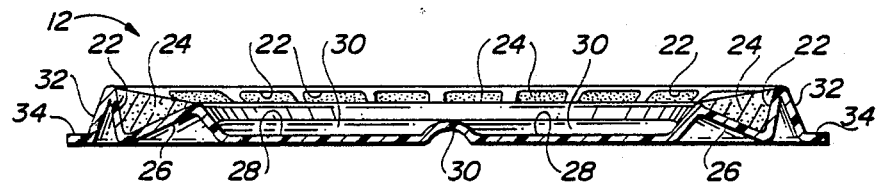
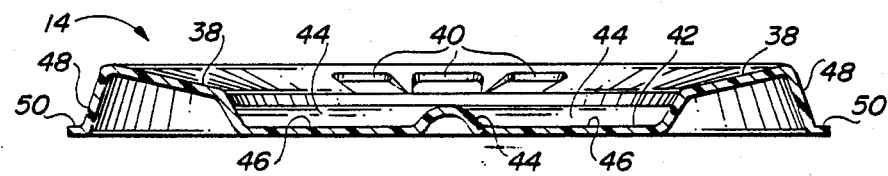
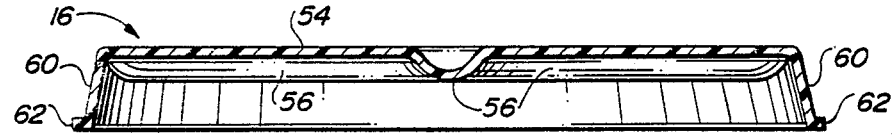
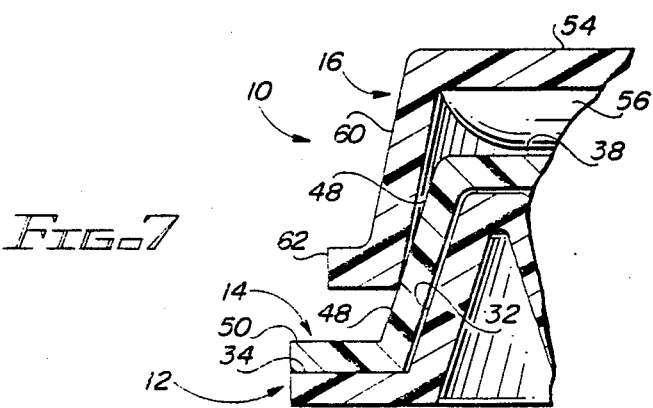

COLOR WHEEL PALETTE

BACKGROUND OF THE INVENTION

1. Field of the Invention

The present invention generally relates to painting means and more particularly to an improved multi-well color wheel paint palette.

2. Prior Art

An artist from time to time normally applies colored oil, water color or tempera paints from tubes in small amounts to separate areas on a flat board or palette and then mixes them in a different area on the board and applies the mixture by brush to a suitable surface, such as a canvass or watercolor or tempera sheet or board in creating a painting. The paints usually stay unsolidified only for a short while and when painting for the day is over, may be scraped from the palette or the palette may be thrown away. Sometimes the palette is covered to keep the paint from drying out and otherwise protected until reused. In the case of dried watercolors, they can be reused merely by applying a wet brush to them.

A number of palettes have been designed to facilitate storage and and application of paints. See, for example, U.S. Pat. Nos. 3,777,414, 1,805,520, 4,027,404, 3,815,265, 748,026, 2,124,810, 2,565,912 and 4,046,250, directed to circular palettes and other devices with spaced paint wells or areas and, in some instances, removable plain covers. In some instances, the wells are arranged to facilitate learning of color blending techniques and contain the paints themselves in a graduated color array. See, for example, U.S. Pat. Nos. 3,815,265, 4,027,404, 1,805,520 and 3,777,414. Most such palettes and teaching aids, however, provide little room for mixing paints together.

Accordingly, there remains a need for an improved art color teaching aid in the form of a palette which permits paints to be held in separate wells and arranged in an informative color sequence in a minimum of space while providing a large paint-mixing area. The palette should be compact, inexpensive, light weight and attractive and include means to protect the paints and preferably provide additional paint-mixing areas for use when needed. The wells of the palette should preferably be shaped to pool and conserve the paint.

The palette is fabricated inexpensively and durably of molded plastic or rubber, or coated fiberboard, or cast or stamped metal or the like, and has an attractive appearance and compact size. Further features of the palette of the present invention are set forth in the following detailed description and accompanying drawings.

DRAWINGS

FIG. 2 is a schematic cross-section taken along the section line 2—2 of FIG. 1;

FIG. 4 is a schematic cross-section taken along the section line 4—4 of FIG. 3;

FIG. 5 is a schematic top plan view of a preferred embodiment of the improved color wheel palette of the present invention, showing the top plate thereof;

FIG. 6 is a schematic cross-section of the top plate of FIG. 5, taken along the section line 6—6 of FIG. 5; and, FIG. 7 is an enlarged, fragmentary schematic cross-section of the palette of FIG. 5, showing the nesting relationship of the top plate, cover plate and bottom plate thereof.

DETAILED DESCRIPTION

FIGS. 1–7.

Figure 1:
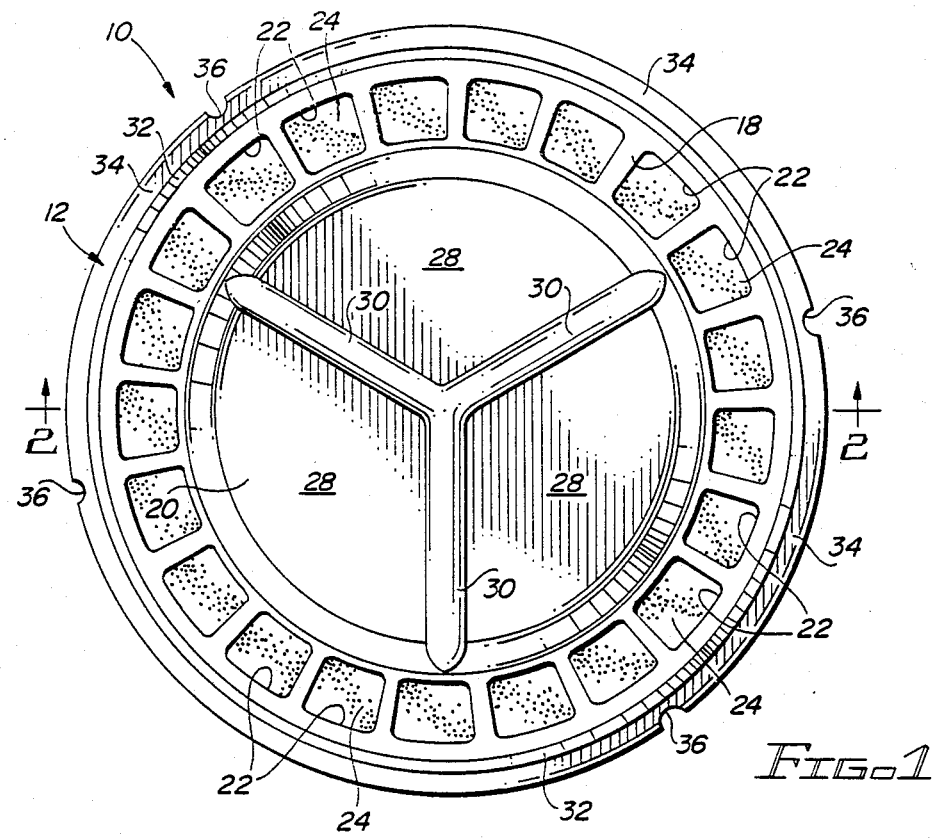
FIG. 1 is a schematic top plan view of a preferred embodiment of the bottom plate of the improved color wheel palette of the present invention.

Now referring more particularly to the drawings, a preferred embodiment of the improved color wheel palette of the present invention is schematically depicted in FIGS. 5 and 7. Thus, palette 10 is shown, which comprises a bottom plate 12 (FIGS. 1 & 2), a cover plate 14 (FIGS. 3 & 4) and optionally but preferably a top plate 16 (FIGS. 5, 6 & 7). Plates 12, 14 & 16 can be of molded plastic, rubber, coated paperboard, cast or stamped metal, ceramic or another material, as desired.

Bottom plate 12 is generally circular and of any suitable diameter, e.g., 14–15 inches, with a raised, for example, about 0.75 inch high, peripheral annular shelf 18 and a non-raised central portion 20, for example, about 9 inches in diameter. Plate 12 preferably is molded in a single piece. Shelf 18 defines a plurality of, preferably, twenty-one, of uniformly spaced wells 22 therearound, preferably containing paints 24 of various colors, such as watercolor paints, preferably arranged according to a predetermined order for instructive color-blending purposes. Each well 22 may be, for example, about 1.5 inches by 1.5 inches. The bottom 26 of each well 22 slopes downwardly outwardly from its inner margin to facilitate pooling of liquid paint 24 when in the well 22 so as to minimize its surface area and help keep it from drying out Central portion 20 is flat and circular, is bordered by raised shelf 18 and is divided into three paint-mixing wells 28 of equal size by three interconnecting raised partitions or ribs 30, for example, each about 0.25–0.50 inch wide each and about 4.5 inches long.

The outer periphery of shelf 18 comprises a sidewall 32 which slopes downwardly and outwardly, as shown in FIG. 2 and ends in a peripheral rim 34 which extends horizontally outwardly therefrom. Rim 34 has four semi-circular cut-out portions 36 which act as indexing or registering marks, as described hereinafter.

Figure 3:
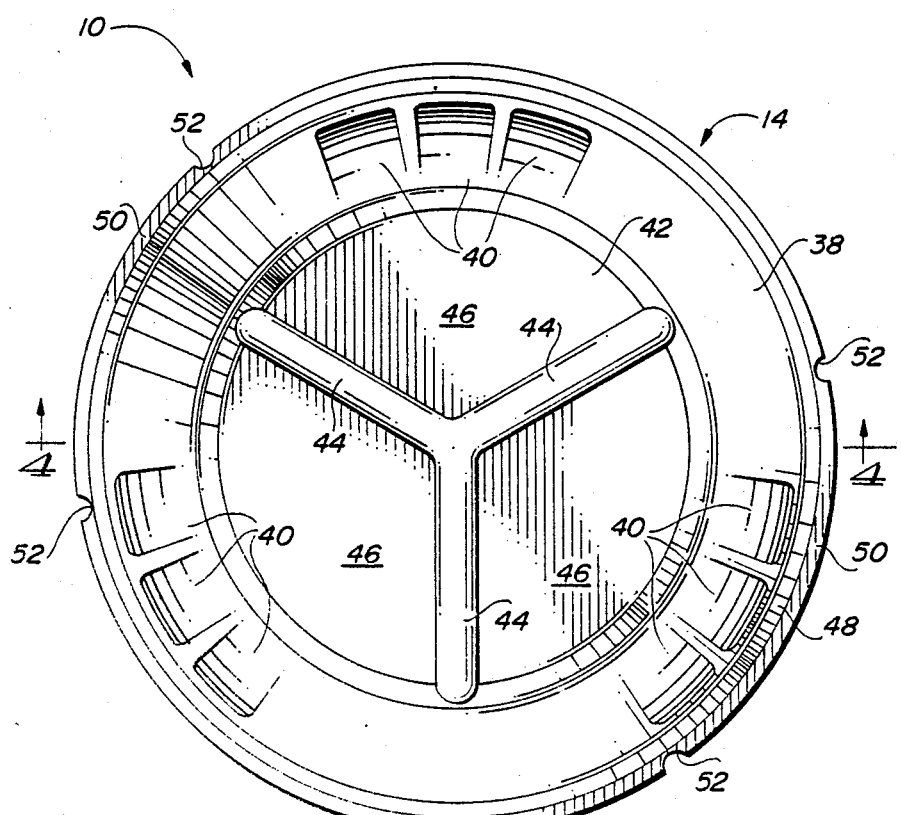
FIG. 3 is a schematic top plan view of a preferred embodiment of the cover plate of the improved color wheel palette of the present invention.

Releasably covering plate 12 is cover plate 14 (FIGS. 3 & 4). Plate 14 is of a slightly larger size than plate 12, but of similar shape, so as to closely nest thereover (FIG. 7). Thus, plate 14 is generally circular, with a raised annular peripheral shelf 38 with color paint wells or paint-mixing wells 40 therein, and a circular non-raised central portion 42 divided by three raised interconnecting partitions 44 into three large paint-mixing wells 46 registering with wells 28 and partitions 30.

Wells 40 are preferably disposed, as shown in FIG. 3, in three groups of three each, each group aligned with a different one of wells 46 for a symmetrical effect. Plate 14 has a peripheral sidewall 48 which flares downwardly outwardly and terminates in a peripheral horizontal rim 50 bearing four semi-circular notches 52 which register with cut-outs or notches 36 on plate 12 to align plate 14 with plate 12 when placing it thereover.

Wells 40 have the same general configuration and slope as wells 22 but are smaller and shallower so as to fit into wells 22 (when plate 14 is seated over plate 12) without touching or approaching bottoms 26, thus allowing paint 24 to be protectively covered in wells 22 against drying without being touched by wells 40. Plate 14 releasably covers and fully protects plate 12 and wells 22 and 28.

Optionally but preferably, palette 10 includes top plate 16 (FIGS. 5, 6 & 7), generally circular and generally similar in configuration to plates 12 and 14 but slightly smaller than plate 14. Plate 16 has a flat top 54 with three interconnecting depressions or grooves 56 therein dividing top 54 into three zones 58. Plate 16 has a depending peripheral sidewall 60 which flares outwardly and downwardly at an angle closer to the vertical than do sidewalls 32 and 48 (FIG. 7).

Accordingly, when plate 16 is stacked on plate 14, the lower inner surface of sidewall 60 intersects the outer surface of sidewall 48 well above rim 50, keeping the underside of top 54 spaced well above shelf 38, as shown in FIG. 7. The lower end of sidewall 60 may terminate in a horizontal peripheral rim 62.

When plate 16 is removed from plate 14 and inverted, zones 58 form three color-mixing wells, thus increasing the available color-mixing space in palette 10. When plate 16 is stacked on plate 14, in turn stacked on plate 12, palette 10 is, as shown in FIG. 5, compact, attractive and easy to store and transport. Palette 10 is also light in weight, durable, inexpensive and effectively seals paints 24 when in wells 22 from drying out. Due to the lay-out of wells 22, each time the artist looks at the palette, he or she can readily visualize a color wheel of graduated colors, thus aiding in selecting and mixing various colors for painting. Various other advantages are as set forth in the foregoing.

Various modifications, changes, alterations, and additions can be made in the improved palette, its components and parameters. All such modifications, changes, alterations and additions as are within the scope of the appended claims form part of the present invention.

What is claimed is:

1. An improved color wheel palette, said palette comprising, in combination:
   (a) a generally circular bottom plate useful as a color palette and having a raised annular peripheral shelf and a non-raised central portion, said shelf having a plurality of spaced color paint wells disposed in said shelf, said central portion being divided into a plurality of separate color mixing wells;
   (b) a generally circular cover plate of about the same size and general configuration as said bottom plate and dimensional so that it releasably stacks completely over said bottom plate to protect color paints when in said color paint wells, said cover plate having a raised annular peripheral shelf and a non-raised central portion, said shelf having a plurality of spaced paint or color-mixing wells shallower than said color paint wells of said bottom plate and in registry therewith to hold said cover plate in place, said central portion of said cover plate being divided into a plurality of separate color-mixing wells in registry with the color-mixing wells of said bottom plate.

2. The improved palette of claim 1 wherein each of said plates has an annular peripheral outwardly extending lower rim and said color paint wells contain color paints of various colors arranged in an instructive color sequence.

3. The improved palette of claim 1 wherein said color paint wells slope downwardly and outwardly from the inner margin thereof, and wherein there are a fewer number of said shelf wells in said cover plate than in said bottom plate.

4. The improved palette of claim 1 wherein there are 21 of said color paint wells in said bottom plate spaced uniformly entirely around said shelf, wherein there are three groups of three of said color paint or color-mixing shelf wells in said cover plate, said group being spaced about 120° apart from each other, and wherein there are three of said central portion color-mixing wells separated by raised dividers in each of said cover plate and bottom plate.

5. The improved palette of claim 1 wherein a generally circular top plate of substantially the same size as said cover plate and bottom plate is releasably disposed on top of said cover plate, said top plate having a plurality of grooves in the top surface thereof dividing said surface into a plurality of zones, said zones forming color-mixing wells when said top plate is removed from said palette and inverted.

6. The improved palette of claim 5 wherein said top plate has a peripheral outwardly lower rim.

7. The improved palette of claim 6 wherein said top plate is slightly smaller in diameter than said cover plate, and wherein each of said three plates has a depending peripheral annular sidewall which flares outwardly and wherein that of said top plate flares less outwardly than those of said cover plate and bottom plate, whereby said top plate stacks on said cover plate with the top of said top plate spaced upwardly from that of said cover plate.

8. The improved palette of claim 4 wherein each of said groups of color paint or color-mixing shelf wells in said cover plate is aligned with a different one of said central portion color-mixing wells in said cover plate.

9. The improved color palette of claim 4 wherein said three plates are fabricated of at least one of plastic, rubber, fiberglass, metal and coated paperboard and wherein said cover plate and bottom plate contains indexing cutout portions in the rims thereof, said rims extending outwardly from the lower ends of said peripheral annular sidewalls.

* * * * *